May 20, 1958
P. KOLLSMAN
2,835,633
APPARATUS FOR PRODUCING CHEMICAL
COMPOUNDS BY ION TRANSFER
Filed March 26, 1951
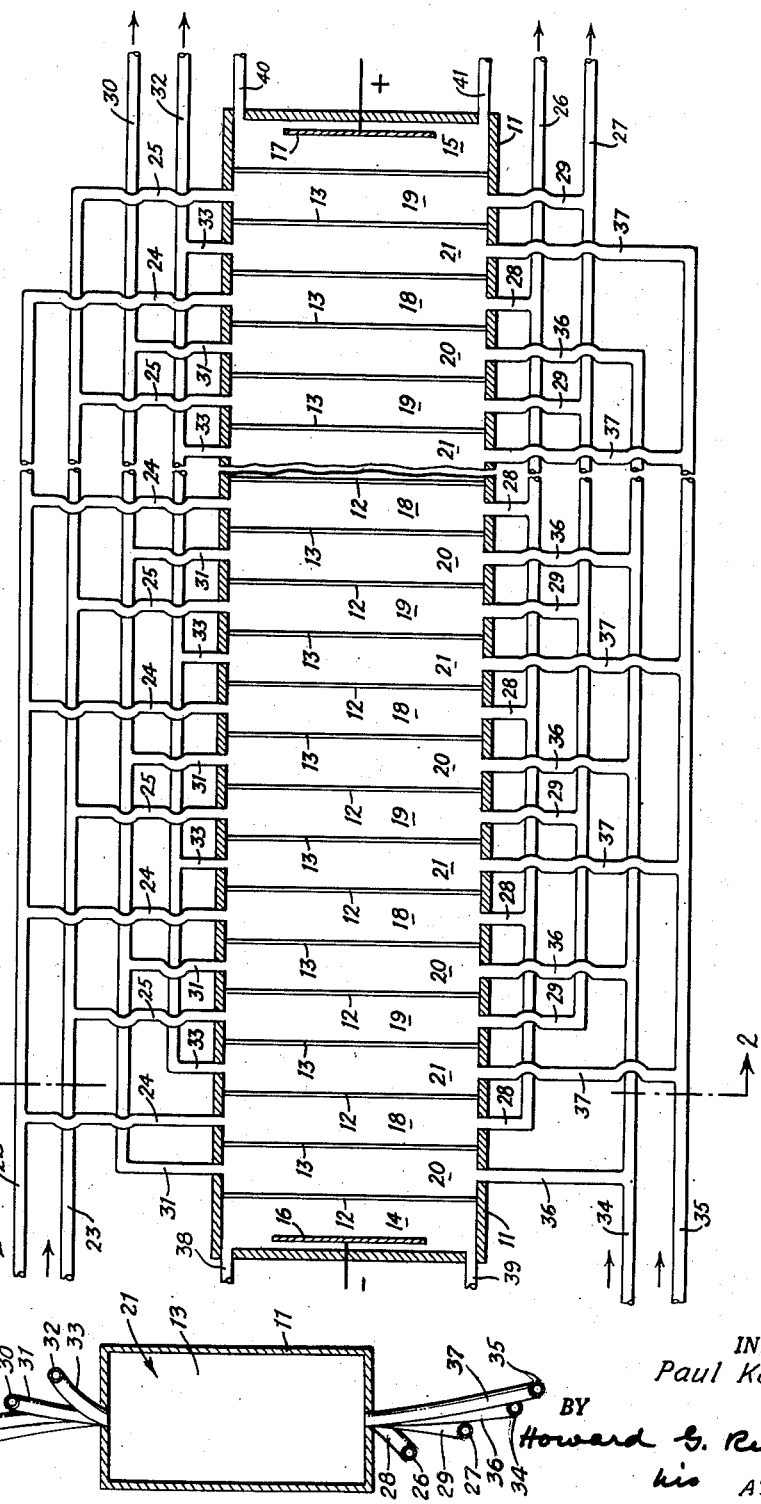
INVENTOR.
Paul Kollsman
BY Howard G. Russell
his ATTORNEY United States Patent Office 2,835,633
Patented May 20, 1958

2,835,633
APPARATUS FOR PRODUCING CHEMICAL COMPOUNDS BY ION TRANSFER

Paul Kollsman, New York, N. Y.

Application March 26, 1951, Serial No. 217,637

8 Claims. (Cl. 204—301)

This invention relates to the art of modifying the chemical composition of substances by a transfer of ions under the influence of an electric current in a process commonly called electrodialysis.

The principle underlying ion transfer is the fact that chemical compounds in solution, for example salt in water, split into charged atomic or molecular particles. These charged particles can be caused to move in a controlled fashion under the influence of an impressed electrical potential, which may conveniently be created between a positively charged anode and a negatively charged cathode. The negatively charged particles tend to travel towards the anode and are called anions for this reason, and the positively charged particles are attracted by the cathode and are called cations.

Means are also known for selectively influencing, restricting, or impeding the movement of ions which are under the influence of an impressed electric bias. Substances are known which, when formed into a thin wall or membrane, are effective fluid-barriers adapted to separate fluid volumes from one another, but which permit anions to pass therethrough while obstructing the passage of cations, and other substances are known which may be shaped into membranes effective as fluid barriers but capable of permitting cations to pass therethrough while restricting the passage of anions.

Still other substances are known which, in the form of a membrane, permit both anions and cations to pass from one volume of fluid into another and from the other volume of fluid into the one volume of fluid. The last named substances are also useful as ion-passage-discriminating fluid barriers in an arrangement in which the impressed electrical bias causes ions of one sign to pass through the membrane while ions of the opposite sign tend to move in the opposite direction, away from the membrane.

The aforementioned principle makes it possible, for example, to reduce the salt content saline solutions by causing ions of the salt to pass from one fluid chamber through appropriate ion-passage-discriminating membranes into other chambers, thus depleting the one volume of fluid of its salt content.

Similarly, it is possible to increase the salt concentration of a volume of saline fluid by transferring into the volume ions removed from other volumes of fluid.

In either instance, the desired product, that is the fluid of reduced or of increased salt content, is the same in character as the fluid originally treated, except for the degree of concentration.

The present invention is concerned with the production of new compounds which, as far as their chemical composition is concerned, are dissimilar from the compounds from which they were produced.

As will be shown by a specific example given further below, it is possible to produce potassium bromide and hydrogen chloride as product compounds, from potassium chloride and hydrogen bromide which entered into the process as source compounds. More generally, it is possible to start with a solution A containing cations A1 and anions A2 and a solution B comprising cations B1 and anions B2 to produce two new solutions C and D in which D comprises cations A1 and anions B2, whereas solution D comprises cations B1 and anions A2.

It is thus possible to produce relatively expensive product compounds by ion transfer from relatively inexpensive source compounds with relatively simple equipment at a relatively low expense of electric energy.

While, in the majority of cases, it will be the object to produce one or two compounds from less expensive source compounds, the basic concept underlying the present invention may be carried further to produce, in the same apparatus, by the same method, and at the same time, a greater number of product compounds from a correspondingly greater number of source compounds.

The present method may be carried out with relatively simple and inexpensive equipment offering the particular advantage that no electrodes are present in the individual compartments or cells in which ion depletion and ion enrichment takes place, except in the two terminal compartments or cells of the apparatus. It is thus possible to carry out reactions which would be disturbed by the presence of electrodes, or which would be adversely affected by, or which would adversely affect, the material from which the electrodes are composed. Thus it is not necessarily an object to produce a costlier product from less expensive source compounds, but it is frequently desirable to reduce the cost of operation, for example by eliminating the consumption and the necessity of replacement of electrodes. In this manner an increased degree of the economy is brought about, even in instances where the product does not command a much higher market price than the source compounds from which it was produced.

In still other instances the present invention permits certain compounds to be produced from certain readily available materials which do not lend themselves to economic processing according to conventional methods.

It is thus easily seen that the invention has a very broad field of application. Generally, it may be stated that the invention relates to processes involving the production of certain chemical compositions from other compositions in which certain constituents of the product occur singly, but not combined. Such processes are sometimes referred to, although somewhat inaptly, as oxidation and reduction processes, even in cases where removal of, or enrichment with, oxygen is not involved.

The various objects, features and advantages of this invention will appear more fully from the detailed description which follows, accompanied by drawings showing, for the purpose of illustration, an apparatus for practising the invention.

The invention also resides in certain new and original features of construction and combination of parts, as well as in certain steps and combination of steps, as hereinafter set forth and claimed.

Although the characteristic features of this invention which are believed to be novel will be particularly pointed out in the claims appended hereto, the invention itself, its objects and advantages, and the manner in which it may be carried out will be better understood by referring to the following description taken in connection with the accompanying drawings forming a part of it, in which:

Figure 1 is a diagrammatic representation, in vertical cross section, of an apparatus embodying the present invention and adapted to carry out the improved method disclosed herein; and Figure 2 is an elevational view taken on line 2—2 of Figure 1.

In the following description and in the claims, various details will be identified by specific names for convenience. The names, however, are intended to be as generic in their application as the art will permit. Like reference characters refer to like parts in the several figures of the drawings.

In the drawings accompanying and forming a part of this specification, certain specific disclosure of the invention is made for the purpose of explanation of broader aspects of the invention, but it is understood that the details may be modified in various respects without departure from the principles of the invention and that the invention may be applied to, and practiced by, other structures than the one shown.

The principle and features of the invention are readily understood by first considering the basic structure of an apparatus for practising it. Figure 1 is a diagrammatic illustration of an apparatus particularly designed for producing one or two product compounds from source compounds having a different chemical composition than the source compounds by a transfer of ions from certain volumes of solution into other volumes.

A tank 11 is subdivided into a plurality of chambers or cells by fluid-separating ion-passage-discriminating walls or membranes made from a suitable composition or material imparting to the walls or membranes the desired ion-passage-discriminating properties under the influence of a certain electric bias as will presently appear. Thus certain membranes are permeable to ions of one sign and passage resistant to ions of the opposite sign, while certain other membranes are of a type permeable to ions of the opposite sign. It is frequently advantageous, but in no way indispensable, that the membranes of the latter type which are permeable to ions of the opposite sign are also passage resistant to ions of the one sign. However, if the latter membranes are permeable to ions of both signs, controlled ion transfer is still accomplished because of the influence of the electric bias and of the tendency of the solution to maintain an ionic balance. This will become apparent from a consideration of the operation of the apparatus illustrated in the drawings. Nevertheless, it may simplify the understanding of the apparatus if it is assumed that one type of membranes is employed which is permeable to ions of one sign and passage resistant to ions of the opposite sign while the other type of membranes is permeable to ions of the opposite sign and passage resistant to ions of the one sign.

Specifically it may be assumed that membranes 12 are anion-permeable and cation-passage-resistant, while other membranes are cation-permeable and anion-passage-resistant or at least cation-permeable although not necessarily also anion-passage-resistant. The membranes are arranged in alternating sequence with respect to traverse of the tank from one end to the other so that a membrane of one type is followed by a membrane of the other type which, in turn, is followed by a membrane of the one type and so forth.

The chambers or cells may be classified into terminal chambers 14 and 15 containing electrodes 16 and 17 and intermediate chambers 18, 19, 20 and 21.

The electrode 16 is connected to the negative pole of a source of electric energy (not shown), thus becoming a cathode and the electrode 17 is connected to the positive-pole of the source, making the electrode 17 an anode.

The intermediate cells may conveniently be grouped into decomposition chambers 18 and 19 and composition chambers 20 and 21, depending on the character of the electrodialytic action taking place therein. The decomposition chambers 18 and 19 may be made narrower than the composition chambers 20 and 21, width being measured between the bordering membranes, but the dimensions may be varied otherwise to suit the particular requirements of each installation. In the diagrammatic drawings chambers of equal width are shown to simplify the illustration.

Speaking first of the decomposition chambers 18 and 19, means are provided for supplying fluid to these chambers. These fluid supply means may be of any suitable form and are shown in the illustrated example as comprising a first source-fluid supply duct 22 and a second source-fluid supply duct 23. The duct 22 is manifolded to supply the decomposition chambers 18 and through branches 24, and the second source-fluid supply duct 23 is manifolded to supply the decomposition chambers 19 through branches 25.

As will later be seen, the source-fluids are depleted of ions during passage through the decomposition chambers 18 and 19 and the remaining ion-depleted fluid is withdrawn from the chambers through withdrawal ducts 26 and 27. Duct 26 is manifolded to chambers 18 by branches 28 and the withdrawal duct 27 is manifolded to the decomposition chambers 19 by branches 29.

Product fluid is withdrawn from the composition chambers 20 through a first product-fluid withdrawal duct 30 having branches 31, and a second product-fluid withdrawal duct 32 is manifolded to the composition chambers 21 by branches 33.

Fluid into which ions are being transferred in the composition chambers may be caused to accumulate in the composition chambers by reason of fluid transfer from the decomposition chambers, making it unnecessary to supply additional fluid to the composition chambers. In many instances the transfer of ions through the membranes is accompanied by a transfer of a fluid sufficient for operation of the apparatus. However, in instances where the volume of fluid thus transferred is not sufficient, fluid may be supplied through further ducts 34 and 35. The supply duct 34 is manifolded to the composition chambers 20 by branches 36, and the supply duct 35 is manifolded to the composition chambers 21 by branches 37.

The fluid supplied through these ducts is selected with regard to the chemical composition of the product to be composed. The fluid may simply be a solvent or diluent for the product or it may contain additional components which are to enter into the composition. The fluid may also be of a character causing the product formed in the composition chambers by ion-transfer to precipitate. All these possibilities will be evident from a consideration of the method about to be described and of the operation of the apparatus hereinafter disclosed in greater detail.

Separate ducts 38, 39, 40 and 41 supply fluid to, and withdraw from, the terminal chambers 14 and 15 containing the electrodes 16 and 17. The fluid of the terminal chambers is preferably handled separately because of certain electro-chemical reactions which may be induced by the physical presence of the electrodes in these chambers making it generally undesirable to mix the product of the terminal chambers with the fluids withdrawn from the composition chambers or from the decomposition chambers.

From the arrangement of the ducts it is evident that the direction of flow through the composition chambers is opposed to the flow through the decomposition chambers. By proper dimensioning of the ducts, or by other convenient means, such as flow restrictions in the ducts, the volumes of fluid passing through the several chambers may be adjusted to predetermined ratios, depending on the degree of concentration to be produced in the composition chambers and other factors governing the operation of the apparatus.

The operation of the illustrated apparatus may be conveniently explained by a specific example. It may be assumed that an aqueous solution of hydrogen bromide is supplied through the ducts 22 and that an aqueous solution of potassium chloride is supplied through the supply duct 23. It may further be assumed that the electrodes 16 and 17 are connected to a source of electrical potential and that product chambers 20 and 21 are filled with a fluid, for example water, having a conductivity sufficient to cause a flow of current to be established between the electrodes. The hydrogen bromide in the decomposition chambers splits into hydrogen cations and bromide anions. The hydrogen cations move towards the cathode and pass through the cation permeable membranes 13, thus accumulating in the chambers 20. The bromine anions move in the opposite direction and pass through the anion permeable membranes 12 and accumulate in the chambers 21.

Similarly, the potassium chloride splits into potassium cations and chloride anions. The potassium cations move towards the cathode and pass through the cation permeable membranes 13, thus accumulating in the chambers 21. The chlorine anions travel in the opposite direction and pass through the anion permeable membranes 12.

The exit of the hydrogen cations from the composition chambers 20 is barred by the membranes 12 which are cation-passage-resistant. In the same manner the exit of the potassium cations from the chambers 21 is barred by the cation-passage-resistant membranes 12.

Considering now the anions, the bromine anions cannot leave the chambers 21 into which they were transferred since the membranes 13 are anion-passage-resistant. For the same reasons chlorine anions are prevented by the membranes 13 from leaving the chambers 20 into which they were transferred.

The accumulation of potassium and bromine ions in the chambers 21 leads to the formation of potassium bromide and the accumulation of hydrogen and chlorine ions in the chambers 20 leads to the formation of hydrogen chloride in the chambers 20.

Thus the constituents of the source products, hydrogen, bromine, potassium and chlorine entering the process are caused to combine as new and different compounds potassium bromide and hydrochloric acid which are then withdrawn from the apparatus as products of the process. No electrodes are physically present in the chambers in which the decomposition and the composition takes place and the process may be carried out continuously. In a similar manner sodium sulphate and water may enter the apparatus or process as source compounds to produce sulphuric acid and sodium hydroxide under the influence of an electric current.

The foregoing examples are therefore merely illustrative of the basic principle of decomposing a first compound A in solution containing cations A1 and anions A2, decomposing a further source compound B in solution comprising cations B1 and anions B2, and so forth, to produce new compounds in which a first compound comprises cations A1 and anions B2, and a second compound comprises cations B1 and anions A2, and so forth.

The products may be withdrawn from the apparatus in solution, or they may be caused to precipitate by adding further substances to the fluids supplied through ducts 34 and 35 causing such precipitation. It is also obvious that additional components for the product compounds may be introduced as part of the fluid flow entering the process through ducts 34 and 35.

The fluid depleted of hydrogen and bromine ions is withdrawn through the duct 26 and the fluid depleted of potassium and chlorine is withdrawn through the duct 27.

A supply of fluid through the ducts 34 and 35 may be dispensed with, if a sufficient volume of fluid passes through the membrane 12 and 13 incidental to the transfer of ions.

A particular feature of the counterflow arrangement of the illustrated apparatus is its favorable effect on the current density and the current distribution. It is evidently desirable to have the greatest current density near the bottom of the chambers in order to transfer the greatest possible number of ions per unit of time from the flow entering the decomposition chambers. A high current density near the bottom of the chambers is promoted by composition chambers so arranged that the greatest concentration and, hence, the greatest conductivity is likewise near the bottom and not near the top, as it would be in an arrangement which does not employ the principle of opposite flow on opposite sides of the membranes.

Fluid may enter and leave the terminal compartments in any desired direction. The ducts 38 and 40 may be inflow ducts, and the ducts 39 and 41 may be discharge ducts, or the ducts 38 and 40 may be discharge ducts and the ducts 39 and 41 be supply ducts or the flow through one terminal compartment may be opposed to the flow through the other terminal compartment.

It was previously mentioned that it is not necessary that all the membranes which are permeable to ions of the one sign are also passage resistant to ions of the opposite sign. It is quite satisfactory that certain membranes are permeable to ions of both signs. Assuming for example that the membranes bordering the chambers 18 are permeable to ions of both signs, this will not interfere with the transfer of hydrogen cations into the chamber 20 nor with the transfer of bromine anions into the chamber 21, since the electric bias causes the ions to move in prescribed directions. As a result the hydrogen cations will accumulate along the membrane 12 bordering the chamber 20, this membrane being cation-passage-resistant and the formation of hydrochloric acid will take place as soon as chlorine ions enter the chamber 20 through the membrane 12.

A similar situation prevails in the chamber 21 where bromine ions tend to accumulate along the anion-passage-resistant membrane 13 bordering the chamber 21. Potassium ions passing through the membrane 13 therefore tend to combine electrically with the bromine ions rather closely to the membrane 13 and there is no inducement for the potassium ions to travel further, even though the next membrane which they would encounter is not anion-passage-resistant.

The substitution of membranes permeable to ions of both signs for certain membranes permeable to passage of ions of one sign but resistant to passage of ions of the opposite sign is sometimes advantageous from a standpoint of economy, either by reason of the fact that substituted membranes are less expensive, are more durable, or have a higher conductivity thereby reducing the power requirement.

In the illustrated form of apparatus composition chambers and decomposition chambers alternate, but it is evident that different reactions take place in successive decomposition chambers and in successive composition chambers. In an apparatus to which two source compounds are supplied and from which two product compounds are withdrawn the same reaction occurs in every second decomposition chamber and in every second composition chamber. Since decomposition chambers alternate with composition chambers, the manifolding of all ducts is in units of four. It logically follows, that three source compounds and three product compounds require manifolding in units of six, and so forth.

Evidently the invention may be applied to, and practised by, various forms of apparatus and is not limited to the specific device illustrated in the drawings. Likewise many kinds of chemical compositions may be decomposed, recomposed or transformed by treatment according to the invention.

In this connection ions of composition may even be replaced by larger electrically charged particles of colloidal size by treatment according to the present method and in the described type of apparatus.

Thus numerous changes, additions, omissions, substitutions and modifications in the apparatus and method steps, as well as other applications of the method and apparatus may be made without departing from the spirit, the teaching, and the principles of the invention.

What is claimed is:

1. An apparatus for producing ionic compounds in solution by ion transfer under the influence of an electric current, particularly for producing a product compound from source compounds of a different chemical composition than the product compound, the apparatus comprising means forming a plurality of liquid chambers, said chambers including terminal electrode chambers, and intermediate chambers lying between said terminal chambers; electrodes in said terminal chambers; liquid separating ion-passage-discriminating membranes between said chambers for establishing selectively restricted paths for ions from chamber to chamber, alternating membranes being permeable to ions of one sign, the remaining membranes lying between said alternating membranes being permeable to ions of the opposite sign and passage resistant to ions of the one sign; means for supplying liquid to said intermediate chambers, said means including four ducts, the first duct being manifolded to supply a certain chamber and every fourth chamber counting from, but not including, said certain chamber, the second duct being manifolded to supply the chamber next to said certain chamber and every fourth chamber counting from, but not including, said next chamber, the third duct being manifolded to supply the chamber adjacent said next chamber and every fourth chamber counting from, but not including said adjacent chamber, the fourth duct being manifolded to the remaining intermediate chambers; and means for withdrawing liquid from said chambers after passage therethrough.

2. An apparatus for producing ionic compounds in solution by ion transfer under the influence of an electric current, particularly for producing a product compound from source compounds of a different chemical composition than the product compound, the apparatus comprising means forming a plurality of liquid chambers, the chambers being arranged in a row; liquid separating ion-passage-discriminating membranes between said chambers for establishing a selectively restricted path for ions from certain chambers into others under the influence of on electric current, alternating membranes being permeable to ions of one sign and passage resistant to ions of the opposite sign, the remaining membranes being permeable to ions of the opposite sign; electrodes in spaced chambers, one electrode serving as an anode, the other electrode serving as a cathode, the chambers lying between the electrode chambers being decomposition chambers and composition chambers depending on the reaction taking place therein, composition chambers and decomposition chambers alternating; liquid supply means for supplying a first source compound solution to alternating decomposition chambers; liquid supply means for supplying a second source compound solution to the remaining decomposition chambers; means for withdrawing liquid from said decomposition chambers; means for withdrawing a first product liquid from alternating composition chambers; and means for withdrawing a second product liquid from the remaining composition chambers.

3. An apparatus for producing ionic compounds in solution by ion transfer under the influence of an electric current, particularly for producing a product compound from source compounds of a different chemical composition than the product compound, the apparatus comprising means forming a plurality of liquid chambers, the chambers being arranged in a row; liquid separating ion-passage-discriminating membranes between said chambers for establishing a selectively restricted path for ions from certain chambers into others under the influence of an electric current, alternating membranes being permeable to ions of one sign and passage resistant to ions of the opposite sign, the remaining membranes being permeable to ions of the opposite sign; electrodes in spaced chambers, one electrode serving as an anode, the other electrode serving as a cathode, the chambers lying between the electrode chambers being decomposition chambers and composition chambers, depending on the reaction taking place therein, composition chambers and decomposition chambers alternating; liquid supply means for supplying a first source compound solution to alternating decomposition chambers, liquid supply means for supplying a second source compound solution to the remaining decomposition chambers; means for withdrawing liquid from said decomposition chambers; means for withdrawing a first product liquid from alternating composition chambers; means for withdrawing a second product fluid from the remaining composition chambers; and means for supplying diluent liquid to said composition chambers.

4. An apparatus for producing ionic compounds in solution by ion transfer under the influence of an electric current, particularly for producing a product compound from source compounds of a different chemical composition than the product compound, the apparatus comprising means forming a plurality of liquid chambers, the chambers being arranged in a row; liquid separating ion-passage-discriminating membranes between said chambers for establishing a selectively restricted path for ions from certain chambers into others under the influence of an electric current, alternating membranes being permeable to ions of one sign and passage resistant to ions of the opposite sign, the remaining membranes being permeable to ions of the opposite sign; electrodes in spaced chambers, one electrode serving as an anode, the other electrode serving as a cathode, the chambers lying between the electrode chambers being decomposition chambers and composition chambers, depending on the reaction taking place therein, composition chambers and decomposition chambers alternating; said intermediate chambers each having a liquid intake and a liquid outlet; a first liquid supply duct connected to alternate decomposition chambers; a second liquid supply duct connected to the remaining decomposition chambers; a first liquid withdrawal duct connected to said alternate decomposition chambers; a second liquid withdrawal duct connected to said remaining decomposition chambers; a third liquid supply duct connected to alternate composition chambers; a fourth liquid supply duct connected to the remaining composition chambers; a third liquid withdrawal duct connected to said alternate composition chambers; a fourth liquid withdrawal duct connected to said remaining composition chambers; and means for supplying liquid to and withdrawing liquid from said spaced electrode chambers.

5. An apparatus for producing ionic compounds in solution by ion transfer under the influence of an electric current, particularly for producing a product compound from source compounds of a different chemical composition than the product compound, the apparatus comprising means forming a plurality of liquid chambers, the chambers being arranged in a row; liquid separating ion-passage-discriminating membranes between said chambers for establishing a selectively restricted path for ions from certain chambers into others under the influence of an electric current, alternating membranes being permeable to ions of one sign and passage resistant to ions of the opposite sign, the remaining membranes being permeable to ions of the opposite sign; electrodes in spaced chambers, one electrode serving as an anode, the other electrode serving as a cathode, the chambers lying between the electrode chambers being decomposition chambers and composition chambers, depending on the reaction taking place therein, composition chambers and decomposition chambers alternating; said intermediate chambers each having a liquid intake and a liquid outlet; a first liquid supply duct connected to alternate decomposition chambers; a second liquid supply duct connected to the remaining decomposition chambers; a first liquid withdrawal duct connected to said alternate decomposition chambers; a second liquid withdrawal duct connected to said remaining decomposition chambers; a third liquid supply duct connected to alternate composition chambers; a fourth liquid supply duct connected to the remaining composition chambers; a third liquid withdrawal duct connected to said alternate composition chambers; and a fourth liquid withdrawal duct connected to said remaining composition chambers, said liquid intakes in said decomposition chambers lying above the liquid outlets in said decomposition chambers, the liquid intakes of said composition chambers lying below the liquid outlets of said composition chambers whereby liquid is caused to flow through the combination chambers in a direction substantially opposed to the flow through said decomposition chambers.

6. An apparatus for producing ionic compounds in solution by ion transfer under the influence of an electric current, particularly for producing a product compound from source compounds of a different chemical composition than the product compounds, the apparatus comprising a pair of spaced electrodes; means forming a plurality of liquid compartments between said electrodes, including liquid separating ion passage discriminating membranes between said compartments for establishing selectively restricted paths for ions from compartment to compartment, alternating membranes being permeable to ions of one sign, the remaining membranes lying between said alternating membranes being permeable to ions of the opposite sign and passage resistant to ions of one sign; and means for supplying and directing four different flows of liquid through said compartments, a first flow passing through a certain compartment and through every fourth compartment counting from, but not including, said certain chamber, a second flow passing through the compartment next to said certain compartment and through every fourth compartment counting from, but not including, said next compartment, a third flow passing through the compartment adjacent said next compartment and through every fourth compartment counting from, but not including said adjacent compartment, and a fourth flow passing through the compartment adjoining said adjacent compartment and through every fourth compartment counting from, but not including said adjoining compartment.

7. An apparatus for producing ionic compounds in solution by ion transfer particularly for producing a product compound from source compounds of a different chemical composition than the product compound, the apparatus comprising means forming a plurality of liquid chambers, said chambers including terminal electrode chambers, and intermediate chambers lying between said terminal chambers; electrodes in said terminal chambers; liquid separating ion-passage-discriminating membranes between said chambers for establishing selectively restricted paths for ions from chamber to chamber, alternating membranes being permeable to ions of one sign, the remaining membranes lying between said alternating membranes being permeable to ions of the opposite sign and passage resistant to ions of the one sign, said intermediate chambers being arranged in four groups, alternating chambers being product liquid chambers, the remaining chambers being source liquid chambers; means for connecting every other product chamber for flow of a product liquid therethrough; means for connecting the remaining product chambers for flow of a second product flow therethrough; means for connecting every second source liquid chamber for flow of a first source liquid therethrough; and means for connecting the remaining source liquid chambers for flow of a second source liquid therethrough.

8. An apparatus for producing ionic compounds in solution by ion transfer particularly for producing a product compound from source compounds of a different chemical composition than the product compound, the apparatus comprising means forming a plurality of liquid chambers, said chambers including terminal electrode chambers, and intermediate chambers lying between said terminal chambers; electrodes in said terminal chambers; liquid separating ion-passage-discriminating membranes between said chambers for establishing selectively restricted paths for ions from chamber to chamber, alternating membranes being permeable to ions of one sign, the remaining membranes lying between said alternating membranes being permeable to ions of the opposite sign and passage resistant to ions of the one sign, said intermediate chambers being arranged in four groups, alternating chambers being product liquid chambers, the remaining chambers being source liquid chambers; conduit means for supplying a first source liquid to every other source liquid chamber; conduit means for supplying a second source liquid to the remaining source liquid chambers; conduit means for withdrawing product liquid from every other product liquid chamber; and separate conduit means for withdrawing product liquid from the remaining product liquid chambers.

References Cited in the file of this patent
UNITED STATES PATENTS

| | | |
|---|---|---|
| 1,861,796 | Hodges | June 7, 1932 |
| 2,636,851 | Juda et al. | Apr. 28, 1953 |
| 2,636,852 | Juda et al. | Apr. 28, 1953 |

OTHER REFERENCES

"Journal of the Electrochemical Society," vol. 97, No. 7 (July 1950), pp. 139C through 151C, paper by Sollner.

"Helvetica Chimica Acta," vol. 23 (1940), pp. 795 through 800, paper by Meyer et al.